United States Patent [19]

Bouffard et al.

[11] 3,722,770

[45] Mar. 27, 1973

[54] METHOD AND APPARATUS FOR CONTROLLING THE PATH OF AN ELONGATE ARTICLE

[75] Inventors: Jean Bouffard, Lachine, Quebec; Yvon Onil Dionne, Chateauguay Center, Quebec, both of Canada

[73] Assignee: Northern Electric Company Limited, Montreal, Quebec, Canada

[22] Filed: Dec. 6, 1971

[21] Appl. No.: 204,938

[52] U.S. Cl. ................................................226/45
[51] Int. Cl. ..............................................B65h 25/02
[58] Field of Search ....................226/45, 42, 23, 44

[56] References Cited

UNITED STATES PATENTS 3,512,691 5/1970 Neifeld et al. ...........................226/23
3,277,305 10/1966 Anderman, Jr. ......................226/45 X
3,119,535 1/1964 Hoffman ................................226/23

Primary Examiner—Allen N. Knowles
Attorney—Sidney T. Jelly

[57] ABSTRACT

Apparatus and method for controlling the passage of a cable, or similar elongated article, through a treatment zone. Sensing devices bear on opposite sides of the article and move with the article when the article departs from the desired path. The detectors are connected in opposition so that if the detectors move in opposite directions, as when the diameter or thickness, of the article changes no output occurs. An output only occurs when the detectors move in unison in the same direction, as when the article departs from the desired path. Thus the apparatus is insensitive to cable diameter and does not require recalibrating for changes in size of cable treated.

2 Claims, 3 Drawing Figures

PATENTED MAR 27 1973 3,722,770
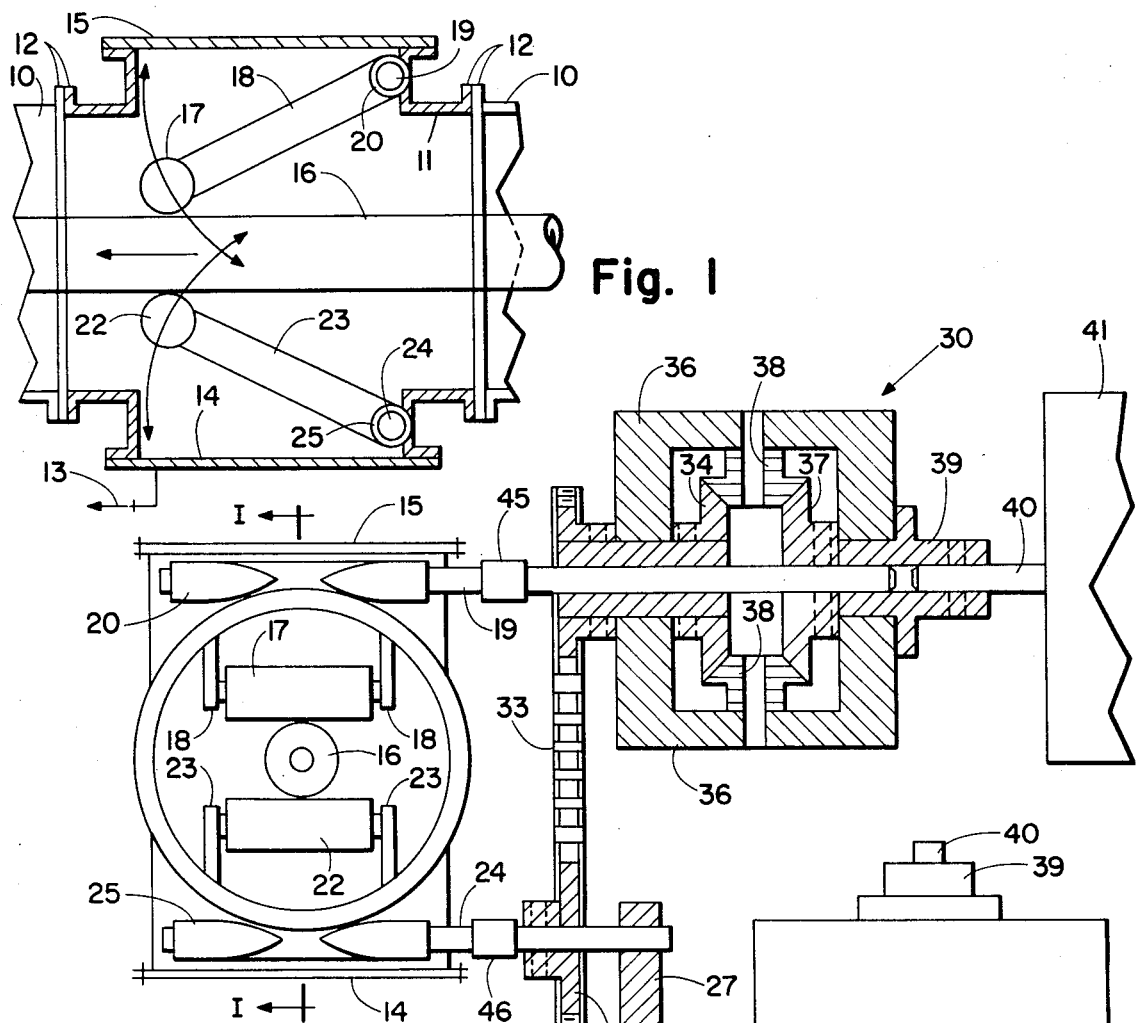
Fig. 1
Fig. 2
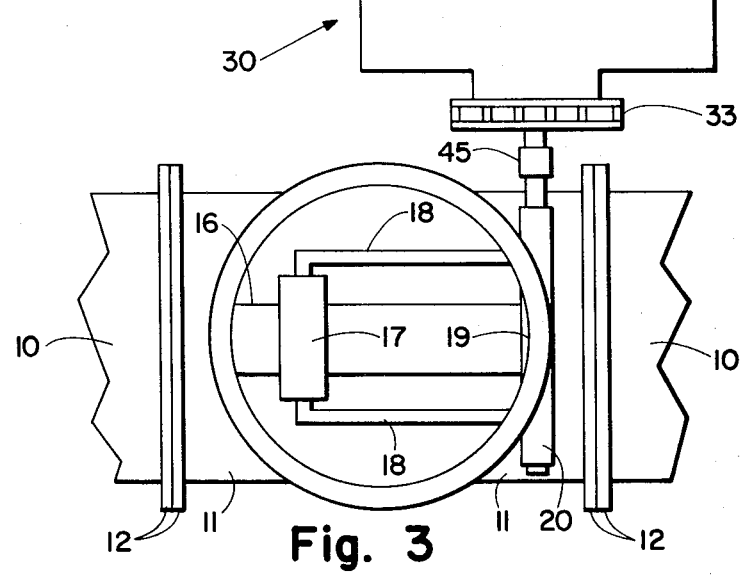
Fig. 3

METHOD AND APPARATUS FOR CONTROLLING THE PATH OF AN ELONGATE ARTICLE

This invention relates to a method of, and apparatus for, centering a cable or similar elongate article with respect to a desired path or position. In particular the invention relates to the centering of a cable, or other elongated article, in a duct such as a heat treatment duct.

Cable sheathing is vulcanized by heating under pressure and one method is to pass the cable through a steam pipe, the cable being heated by the steam, the steam at a predetermined pressure. The cable passes through seals at each end. The cable should not touch the walls of the steam pipe—damage to the sheath and possibly also to the conductors may occur—and often some form of support is provided such as rollers. In a particular method the cable is suspended more or less freely in the steam pipe in the form of a catenary. Owing to its weight the cable follows a slightly curved path and it is essential to prevent the cable hanging so low at its mid point as to touch the pipe. At the same time it is necessary to avoid creating too high a tension in the cable in order to prevent the cable touching. As a compromise support rollers may be provided at midspace. In an alternative method the cable passes vertically through a treatment pipe.

In one aspect, the present invention provides, for a freely suspended extenary path for the cable, the position of the cable in the steam pipe detected by sensing devices in contact with the cable, variation in the cable position resulting in an output signal. The output signal can be used to control the motor or drum or other apparatus pulling the cable through the steam pipe so that the cable follows the desired path. The sensing devices contact the cable and are independent of cable size.

In its broadest aspect the invention provides a method of and apparatus for controlling the passage of an elongated article along a predetermined path in which sensing devices act upon the article, in opposition, any departure from a desired path actuating the sensing devices to produce an output signal, the signal applied to the means moving the elongated article along the catenary path.

In accordance with one feature of the invention, apparatus for controlling the path of an elongated article comprises a first sensing device in contact with one side of the article, a second sensing device in contact with the opposed side of the article and means connected to the sensing devices whereby symmetrical movement apart of the sensing devices produces no output signal and differential movement of the sensing devices produces an output signal, said signal available for application to the drive means moving the article.

In accordance with another feature of the invention, a method of controlling the path of an elongate article, comprises moving the article along a path; positioning a sensing device on each side of the article, the sensing devices in opposition, generating a signal from each sensing device indications of movement of the devices, and combining the signals to produce an output only when the axis of the article departs from the desired path.

In a particular aspect, the sensing devices are opposed in a vertical direction and detect vertical displacement of the article.

The invention will be readily understood by the following description of one embodiment, by way of example, in conjunction with the accompanying diagrammatic drawings, in which:-

FIG. 1 is a vertical cross-section on the line I-I of FIG. 2;

FIG. 2 is an end view of the apparatus of FIG. 1, with associated differential gear in cross-section, and FIG. 3 is a plan view, with a blanking flange removed.

As seen in FIG. 1, inserted in the steam pipe 10 is a short section 11 connected to the pipe 10 at flanges 12. A moisture drain, or steam trap, illustrated diagrammatically at 13, is provided in a blanking flange 14 which closes off the bottom of the short section 11. A further blanking flange 15 closes off the top of the section 11.

A cable 16 is shown passing through the pipe 10 and the section 11. Situated above the cable 16 and in contact therewith is an upper roller 17, carried on pivot links 18. Pivot links 18 are pivotally carried on an upper shaft 19 supported in a bushing 20.

Situated below the cable is a lower roller 22 carried on pivot links 23. Pivot links 23 are pivotally carried on a lower shaft 24 supported in a bushing 25. As will be seen in FIG. 2 the lower shaft 24 extends laterally on one side and carries first a lower sprocket, or gear 26, and then a counterweight 27. Counterweight 27 acts to maintain the lower roller 22 in contact with the cable.

The upper shaft 19 also extends laterally, on one side, as seen in FIGS. 2 and 3. Mounted axially on the upper shaft 19 is a differential gear, indicated generally at 30. The differential gear comprises a first bush 31 freely rotatable on the upper shaft 19. Fixedly mounted on the end of the bush 31 nearest to the short section 11 is a sprocket or gear 32. Sprocket 32 is aligned with sprocket 26 on the lower shaft 24 and is connected thereto by a roller chain 33. On the other end of the bush 31 is fixedly mounted a first planetary gear 34. Between the sprocket 32 and the first planetary gear 34 is one side of the housing or cage 36 of the differential gear. A second planetary gear 37 is fixedly mounted on the upper shaft 19, the two planetary gears connected by satellite gears 38 carried by the housing or cage.

The other side of the housing or cage 36, remote from the sprocket 32, has a bush 39 fixedly mounted therein and the end of the upper shaft 19 is rotatably supported in bush 39. Also supported in bush 39 and fixed thereto is an output shaft 40. The output shaft 40 is connected to a control device 41. As seen in FIG. 3, the bushings 20 and 25 do not extend through the exterior of the section 11, to permit movement of the pivot links 18 and 23. Couplings 45 and 46 are provided to permit easy separation of the differential 30.

The apparatus operates as follows. The cable 16 is fed through the steam pipe 10, in the direction of the arrow "A" (FIG. 1). The cable is pulled through by a motor driven drum or sheave, the cable also passing over a further drum or sheave prior to entering the steam pipe. This further drum or sheave may be freely rotating or have a brake mechanism for controlling its speed. The cable passes through the pipe 10 as a freely supported length following a catenary path. The vertical position of the cable in the sleeve pipe 10, at its midpoint, will depend upon the tension in the cable.

In the arrangement illustrated, the rollers 17 and 22 are in contact with the cable. If the cable rises in the section 11, roller 17 rises and shaft 19 is rotated clockwise in FIG. 1. Similarly roller 22 rises and shaft 24 is rotated clockwise in FIG. 1. Rotation of shaft 19 rotates planetary gear 37 and rotation of shaft 24 causes rotation of planetary gear 34 via sprockets 26 and 32 and belt 33. The two planetary gears rotate in the same direction and this causes rotation of the housing or edge 36 of the differential 30. Rotation of the housing 36 rotates bush 39 and output shaft 40.

Resulting from rotation of the shaft 40 the control device 41 will either slow down the drive motor or, if a brake mechanism is fitted to the drum at the beginning of the steam pipe, release the brake slightly. A feed back to the control device 41 will occur as the cable assumes its correct position in the section 11.

The reverse action occurs if the cable moves down in the section 11. Rollers 17 and 22 move down, shafts 19 and 24 rotate counterclockwise as seen in FIG. 1, the planetary gears 34 and 37 rotate and cause rotation of the housing 36, bush 39 and output shaft 40 in a direction reverse to that when the cable rises.

The apparatus is independent of any variation in cable size, and therefore no calibration, or resetting, is necessary for a change in the size of cable being treated. This will be understood from the following description.

With an increase in cable diameter, the rollers 17 and 22 move in opposite directions, roller 17 upward and roller 22 downwards, by an equal amount, shaft 19 rotates clockwise, as seen in FIG. 1, and shaft 24 anti-clockwise. Planetary gear 37 also rotates with shaft 19, while planetary gear 34 rotates with shaft 24, but with gear 34 rotating in the opposite direction to that of gear 37. With gears 34 and 37 rotating in opposite directions—the same angular amount— there is no rotation of the housing 36. With no rotation of the housing, there is no rotation of the bush 39 or output shaft 40. Similarly with a decrease in cable diameter there is no rotation of the output shaft 40.

Thus the invention provides for simple and effective positioning of the cable in the steam pipe 10. The cable can be positioned to be on the axial center-line in the short section 11, or at some position above or below the center-line.

Various modifications can be made to the apparatus. Thus, for example, instead of the sprockets 26 and 32 being connected by a roller chain 33, a toothed belt can be used, or a gear train as long as the direction of rotation of the bush 31 and planetary gear 34 is in the same direction as shaft 24. Suitable spring loading of the link chain, or toothed belt, can be provided; in the normal manner.

The invention is also applicable to other elongated articles such as tubes and flat belts.

What is claimed is:

1. Apparatus for controlling the path of travel of an elongate article, comprising: a first sensing device for contacting one side of said article and a second sensing device for contacting an opposed side of said article, the two sensing devices in opposition; output means; and a differential gear connecting said sensing devices to said output means, the first sensing device arranged to rotate one of the gears in said differential, the second sensing device arranged to rotate another gear in said differential, the differential gear adapted and arranged to actuate said output means only when said sensing devices are moved in the same direction.

2. Apparatus as claimed in claim 1, the first sensing device connected to a first planetary gear, the second sensing device connected to a second planetary gear, said planetary gears connected by at least one satellite gear supported in a housing of the differential gear, the output means comprising a shaft connected to said housing.

* * * * *